United States Patent
Shin et al.

(10) Patent No.: US 10,789,565 B2
(45) Date of Patent: Sep. 29, 2020

(54) ENGAGEMENT GUARANTEE SYSTEM USING A GAMIFICATION METHOD

(71) Applicants: HYUNDAI MOTOR COMPANY, Seoul (KR); KIA MOTORS CORPORATION, Seoul (KR); IUCF-HYU (Industry-University Cooperation Foundation Hanyang University), Seoul (KR)

(72) Inventors: Jongho Shin, Uiwang-si (KR); Chang Ho Jung, Ulsan (KR); Hyunwoo Lee, Ulsan (KR); Yoon Jang, Incheon (KR); Seunghwan Roh, Seoul (KR); Jiyoung Lee, Seongnam-si (KR); Kyoungwon Seo, Seoul (KR); Jihyo Kim, Seoul (KR); Hokyoung Ryu, Seongnam-si (KR)

(73) Assignees: HYUNDAI MOTOR COMPANY, Seoul (KR); KIA MOTORS CORPORATION, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 254 days.

(21) Appl. No.: 15/701,119

(22) Filed: Sep. 11, 2017

(65) Prior Publication Data

US 2018/0285803 A1     Oct. 4, 2018

(30) Foreign Application Priority Data

Mar. 29, 2017   (KR) .................. 10-2017-0039851

(51) Int. Cl.
*G06Q 10/06*   (2012.01)
*G06Q 10/10*   (2012.01)
(Continued)

(52) U.S. Cl.
CPC ....... *G06Q 10/06398* (2013.01); *B25B 23/14* (2013.01); *G01L 3/00* (2013.01);
(Continued)

(58) Field of Classification Search
CPC ....... G06Q 10/06398; G06Q 10/06393; G06Q 10/1057; G06F 3/048
(Continued)

(56) References Cited

U.S. PATENT DOCUMENTS 6,865,958 B2 *   3/2005   Herbold ................ G01L 3/1457
                                                          73/862.046
7,096,569 B1 *   8/2006   Barr ........................ B25B 23/14
                                                          29/700
(Continued)

FOREIGN PATENT DOCUMENTS

JP         2015016854         *   1/2015   ........... G05B 19/402
KR    1020150102001 A       12/2016

OTHER PUBLICATIONS

Christian Deters, Hak-Keung Lam, Senior Member, IEEE, Accurate Bolt Tightening Using Model-Free Fuzzy Control for Wind Turbine Hub Bearing Assembly IEEE Transactions on Control Systems Technology, vol. 23, No. 1, Jan. 2015 (Year: 2015).*

(Continued)

*Primary Examiner* — Rutao Wu
*Assistant Examiner* — Abdallah A El-Hage Hassan
(74) *Attorney, Agent, or Firm* — Lempia Summerfield Katz LLC (57) ABSTRACT

An engagement guarantee system uses a gamification method and includes a sensor configured to sense vehicle data from a vehicle tag attached to a vehicle, to sense tool data from a tool tag attached to a tool, and to transmit the sensed data to a server A controller is configured to receive the vehicle data and the tool data from the server, to transmit (Continued)

an engagement torque corresponding to the vehicle to the tool, and to receive an engagement result from the tool An analyzer is configured to receive the engagement result from the controller, to analyze the engagement result, and to transmit an analyzed result to a display unit. The display unit is configured to display the analyzed result transmitted from the analyzer.

14 Claims, 8 Drawing Sheets

(51) Int. Cl.
*G06F 3/048* (2013.01)
*B25B 23/14* (2006.01)
*G01L 3/00* (2006.01)
*G01L 25/00* (2006.01)
*G01L 5/00* (2006.01)
*G05D 17/00* (2006.01)
*G05D 17/02* (2006.01)
*G06Q 10/00* (2012.01)

(52) U.S. Cl.
CPC ....... *G06F 3/048* (2013.01); *G06Q 10/06393* (2013.01); *G06Q 10/1057* (2013.01); *B25B 23/1405* (2013.01); *G01L 5/0042* (2013.01); *G01L 25/003* (2013.01); *G05D 17/00* (2013.01); *G05D 17/02* (2013.01)

(58) Field of Classification Search
USPC ....................................................... 705/7.39
See application file for complete search history.

(56) References Cited

U.S. PATENT DOCUMENTS

| 2012/0108303 | A1* | 5/2012 | Sogabe | ................. | A63F 13/812 |
| | | | | | 463/3 |
| 2018/0129992 | A1* | 5/2018 | Lord | ....................... | G06Q 50/28 |
| 2018/0232681 | A1* | 8/2018 | Matsuura | .......... | G06Q 10/06398 |

OTHER PUBLICATIONS

Takanobu Otsuka, Yuichi Kubota and Takayuki Ito Center for Green Computing, University of Nagoya Institute of Technology, An Implementation of a Precision Fastener Management System for Aircraft Manufacturing, Proceedings of the 2012 IEEE ICMIT (Year: 2012).*

* cited by examiner

| NG | Bad |
|----|-----|
| OK | normal (±10%) |
|    | good (±5%) |
|    | excellent (±2%) |

ENGAGEMENT GUARANTEE SYSTEM USING A GAMIFICATION METHOD

CROSS-REFERENCE TO RELATED APPLICATION

This application claims priority to and the benefit of Korean Patent Application No. 10-2017-0039851 filed in the Korean Intellectual Property Office on Mar. 29, 2017, the entire contents of which are incorporated herein by reference.

BACKGROUND

(a) Field of the Disclosure

The present disclosure relates to an engagement guarantee system using a gamification method.

(b) Description of the Related Art

Currently, vehicle makers generally weld and assemble tens of thousands of components to manufacture a vehicle.

Particularly, most of the work done in the design process is to create an engagement process to fasten various components to a vehicle body by using fastening members such as bolts and nuts.

Since the engagement process is directly related to quality indexes of the vehicle, as perceived by a consumer, such as durability and quietness of the complete vehicle, thorough engagement history management of the components for the vehicle is required.

However, even though importance of the engagement history management of the components for the vehicle is recognized in the art, engagement history management with high effectiveness is not properly implemented due to technical limitations.

According to a conventional art, when a component is fastened to a predetermined position by using an engagement tool, NG or OK is displayed on a status board. The board simulates the fastened position and is provided to display the engagement report.

This is a direct instruction to recognize that the current work is the engagement work and to check the engagement result. This repetition may lower worker concentration, which can cause some omissions in the work, and can also make it difficult to draw the continuous attention of the worker.

In addition, in a mixed-model production line (when multiple models are produced on a same line), it is required to install as many status boards as the number of the models of vehicles. Since the characteristic of a worker has not been considered, a mechanical and simple result-checking device was used without consideration of whether the worker is interested in the work or whether the worker is absorbed in the work.

In addition, according to the conventional art, a device for granting incentives for workers has been introduced. The device focuses on the short term, but does not consider the granting of incentives for workers over the medium to long term.

Therefore, it is necessary to study a method and system that can improve immersion, emotion, and performance of the workers over the medium and long term.

Particularly, monitoring devices are installed to show work results to the workers for effective assembly, quality inspection, and the like in a production spot. Examples of the monitoring devices may include an engagement torque value display device, a color-using device (red NG and green OK), and a sound-using device (e.g., a beep).

These devices are intended to enable a corresponding worker to recognize only the result of the work, and to give the highest priority to visibility and recognition. However, these devices may increase the stress of the workers. In addition, the workers do not sufficiently exert such effects as changing the devices so as to not operate. Further, it is difficult for the workers to continuously maintain the result of work that was initially achieved.

The above information disclosed in this Background section is only for enhancement of understanding of the background of the disclosure and therefore it may contain information that does not form the prior art that is already known in this country to a person of ordinary skill in the art.

SUMMARY

Accordingly, a feedback environment for the work is needed. Also, a need for the development of a system that enables continuous connection of feedback results with performance has been continuously raised.

The present disclosure provides an engagement guarantee system using a gamification method. The disclosed system provides an incentive to a worker by gamifying work for fastening components to a vehicle to more efficiently or effectively improve work efficiency of the worker. An embodiment of the present disclosure provides an engagement guarantee system using a gamification method. The system includes a sensor configured to sense vehicle data from a vehicle tag attached to a vehicle, to sense tool data from a tool tag attached to a tool, and to transmit the sensed data to a server. The system includes a controller configured to receive the vehicle data and the tool data from the server, to transmit an engagement torque corresponding to the vehicle to the tool, and to receive an engagement result from the tool. The system includes an analyzer configured to receive the engagement result from the controller, to analyze the engagement result, and to transmit an analyzed result to a display unit. The display unit is configured to display the analyzed result transmitted from the analyzer.

The analyzer may determine whether the engagement torque of the tool is included in a predetermined range, to generate an engagement-defect signal or an engagement-normal signal depending on a determined result, and to transmit the result to the display unit.

The engagement result includes an engagement-defect signal, an engagement-normal signal, an actual engagement torque, an engagement order, and a work time.

The analyzer may determine an achievement level of an engagement process by using the engagement-defect signal, the engagement-normal signal, the actual engagement torque, the engagement order, and the work time.

The achievement level may include a predetermined grade. The predetermined grade may include or be expressed as one of a first grade (Excellent), a second grade (Good), a third grade (Normal), and a fourth grade (Bad).

An engagement torque corresponding to the vehicle may be predetermined depending on an engagement process and an engagement order.

The analyzer may analyze performance of the work depending on an engagement result. The performance may include short-term performance, mid-term performance, or long-term performance.

The short-term performance may include a first grade (Excellent), a second grade (Good), a third grade (Normal), and a fourth grade (Bad).

The analyzer may generate a combo signal when an engagement torque of the tool is continuously included in a predetermined range based on a reference value. The mid-term performance may include a combo score of accumulated combo signals.

The long-term performance may include a character showing a worker, a stage showing a route displayed on a screen of the display unit to correspond to an entire engagement process, and a ranking of the worker with respect to all workers.

The analyzer may generate a combo signal when an engagement torque of the tool is continuously included in a predetermined range based on a reference value. The display unit may include an elapsed time display area, which displays a predetermined entire work elapsed time. The display unit may include a combo score display area, which displays a combo score of accumulated combo signals that is generated by the analyzer when an engagement torque of the tool is continuously included in a predetermined range based on a reference value. The display unit may include a result display area, which displays a result depending on the engagement result.

The analyzer may analyze a score to be given to a worker who uses the tool, using the engagement result. The display unit may display a screen corresponding to the score.

According to an embodiment of the present disclosure, in an operation of fastening a component to a vehicle by using a tool, it is possible to effectively offer an incentive for an engagement operation by sensing an engagement torque, an engagement order, and a work time, by analyzing the sensed torque, order, and time, by digitizing an engagement result for the engagement operation, and by displaying the engagement result to a worker.

In addition, it is possible to give continuous incentives to workers, depending on the engagement operation, by dividing an engagement result into short-term performance, mid-term performance, and long-term performance.

The following reference symbols are used throughout the detailed description and in the drawing figures.

100: worker
115: tool tag
117: tool
120: vehicle tag
125: vehicle
130: sensor
135: server
140: controller
145: analyzer
150: display unit
200: first area
205: second area
210: third area
225: fourth area
215: fifth area
220: sixth area

DETAILED DESCRIPTION OF THE EMBODIMENTS

The present disclosure relates to an engagement guarantee system using a gamification method. The method checks a vehicle by using a sensor, senses an engagement torque, senses a component engaged with the vehicle, and manages an engagement torque by digitizing the engagement result, to effectively facilitate efficiency of a worker.

Hereinafter, an embodiment of the present disclosure is described in detail with reference to the accompanying drawings The size and thickness of each component illustrated in the drawings are arbitrarily shown for ease of description. The present disclosure is not limited thereto and the thicknesses of portions and regions are exaggerated for clarity.

Parts that are irrelevant to the description are omitted to clearly describe an embodiment of the present disclosure. Like reference numerals designate like elements throughout the specification, which also applies to the related art.

In the following description, dividing names of components into first, second, and the like is to divide the names because the names of the components are the same. An order of such components having the same name is not particularly limited by the use of such naming conventions.

The present disclosure proposes a new type of interface for how to provide feedback on work performance in order to improve immersion, emotion, and work performance when engagement work is performed along a factory line.

Specifically, the disclosed interface determines feedback grades (Excellent, Good, Normal, and Bad) based on the work performance (an engagement OK/NG result, a torque value, an engagement time, and an engagement order), and provides different results for the feedback grades depending on short-term, mid-term, and long-term points.

The disclosed technique connects the work with a gamified story. The disclosed technique is provided to suppress workers from feeling tedium because of repetitive work and to guide the workers as if they are playing games instead of working. The discloses technique is configured such that they remove a work burden even while working by providing a device for preventing the workers from solely concentrating on the engagement work itself.

For example, the gamified interface may display the number and positions of bolts to be engaged at each step as gamified elements to minimize the tedium and antipathy of the work.

In addition, after the engagement, the engagement result may be immediately fed back to the worker using a visual or auditory device to instantly confirm their own result and to acquire an item to be achieved in a gamified scenario.

Furthermore, the interface has an internal algorithm that accumulates data and adjusts a level of difficulty by itself to match the level of a worker who is currently working. Thus, the internal algorithm can update and set a custom worker environment by analyzing a process, speed, a pass rate, and the like.

Figure 1:
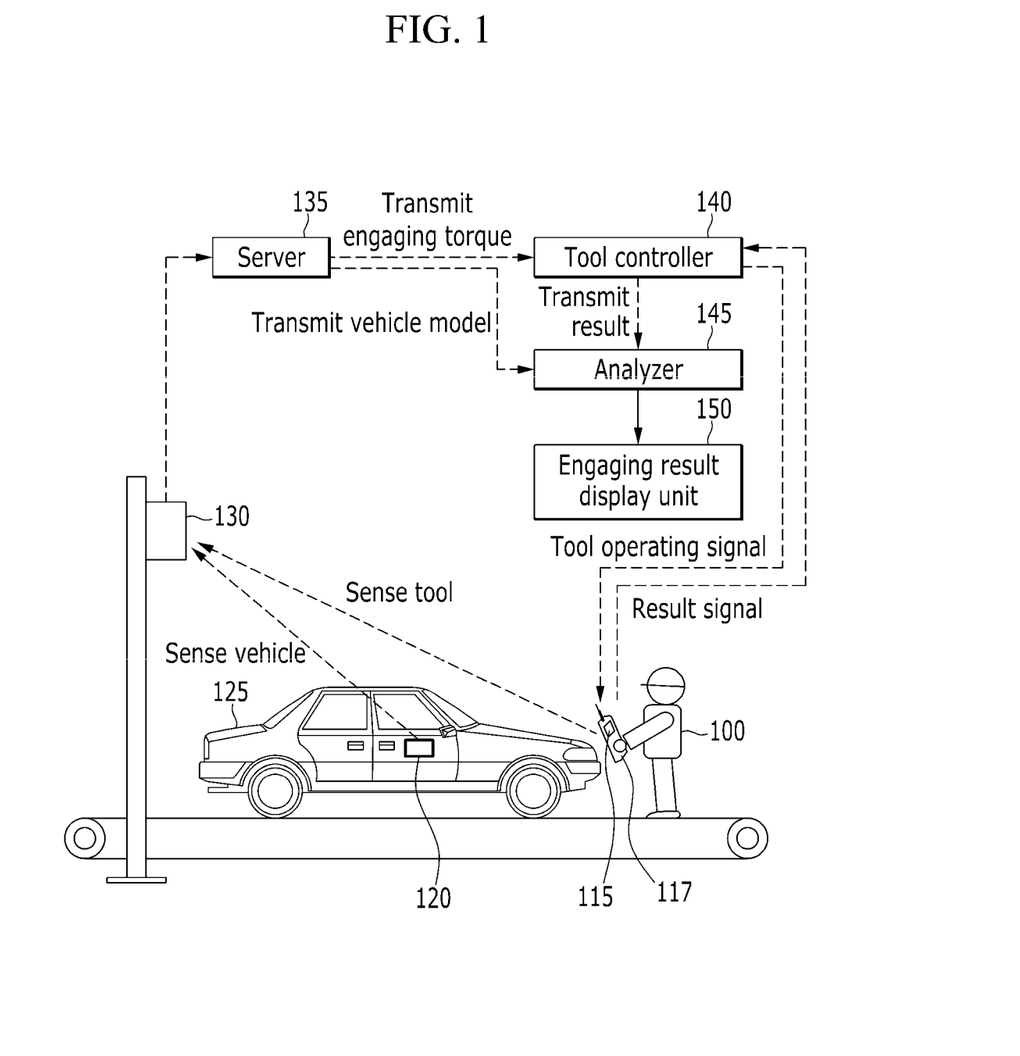
FIG. 1 is a schematic diagram illustrating an engagement guarantee system using a gamification method according to an embodiment of the present disclosure.

FIG. 1 is a schematic diagram illustrating an engagement guarantee system using a gamification method according to an embodiment of the present disclosure.

Referring to FIG. 1, the engagement guarantee system using the gamification method includes, as major constituent elements, a worker 100, a tool 117, a tool tag 115, a vehicle 125, a vehicle tag 120, a sensor 130, a server 135, a controller 140, an analyzer 145, and an engagement result display unit 150.

When the vehicle 125 moves along a conveyor and reaches a predetermined position, the sensor 130 wirelessly senses the vehicle tag 120 attached to the vehicle 125 and transmits sensed vehicle information to the server 135.

In addition, the sensor 130 wirelessly senses the tool tag 115 attached to the tool 117 and transmits tool information to the server 135.

The server 135 determines whether the vehicle 125 and the tool 117 are matched by using information of the vehicle 125 and the tool 117. The server 135 transmits an engagement torque of the tool 117 to the controller 140 and transmits vehicle information including a vehicle model to the analyzer 145.

The controller 140 transmits an operation signal including an engagement torque to the tool 117. The tool 117 transmits the engagement result to the controller 140. The controller 140 transmits the engagement result to the analyzer 145.

The analyzer 145 receives the engagement result from the controller 140 to analyze it and transmits the analyzed information to the display unit 150. The display unit 150 displays the analyzed information in a predetermined form and a worker recognizes the information through a screen displayed on the display unit 150.

In addition, the engagement result may be stored in a predetermined storage unit (not illustrated). An engagement history for components of the vehicle is managed by using the stored information.

The server 135, the controller 140, or the analyzer 145 may be implemented by one or more microprocessors operated by a predetermined program. The predetermined program may include a series of instructions for performing a method according to an embodiment of the present disclosure described below.

Figure 2:
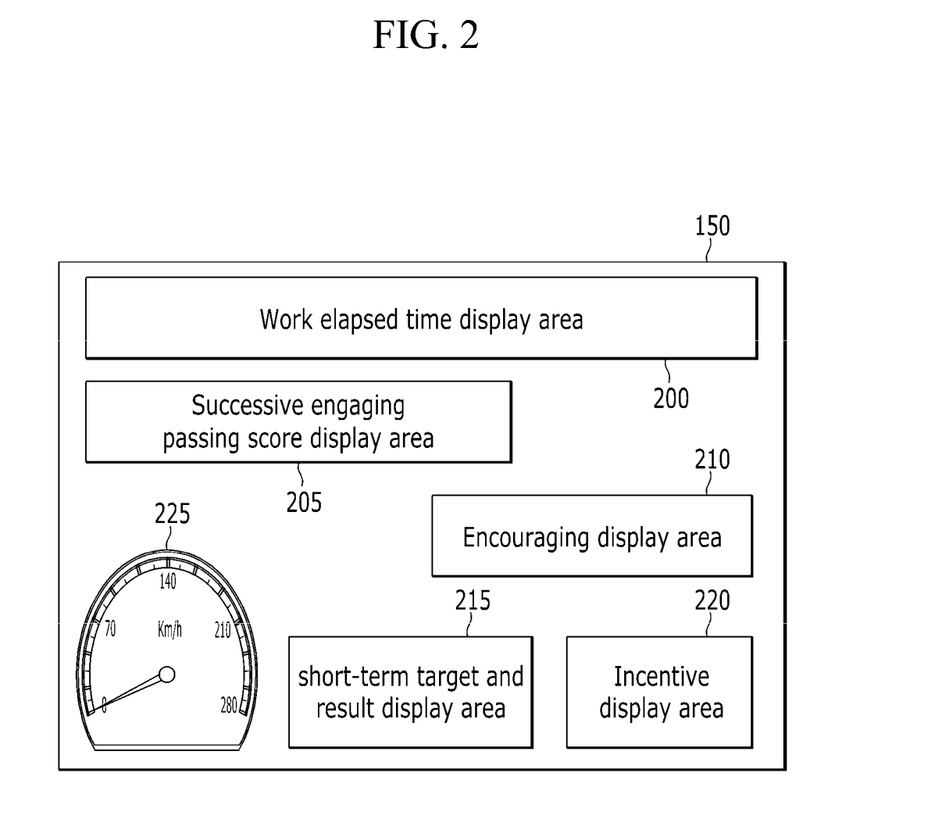
FIG. 2 is a schematic diagram illustrating a display unit of an engagement guarantee system according to an embodiment of the present disclosure.

FIG. 2 is a schematic diagram illustrating a display unit of an engagement guarantee system according to an embodiment of the present disclosure.

Referring to FIG. 2, the display unit 150 may include, as an example, a first area 200, a second area 205, a third area 210, a fourth area 225, a fifth area 215, and a sixth area 220.

The first area 200 may display an elapsed time of work, the second area 205 may display a successive passing score of engagement, and the third area 210 display an encouraging image. Herein, the encouraging image may include a wagon, a vehicle, or a cultivator. Herein, the elapsed time of work may be expressed as a progress bar depending on time.

The fourth area 225 may display a work speed, the fifth area 215 may display a short-term engagement target and a short-term engagement result, and the sixth area 220 may display an incentive. Herein, the incentive may be expressed in the progress bar by accumulating successive engagement scores.

In the present embodiment, positions and shapes of the first area to the sixth area may be modified depending on design specifications. Contents included in each of the areas may be changed to the contents of this specification.

Figure 3:
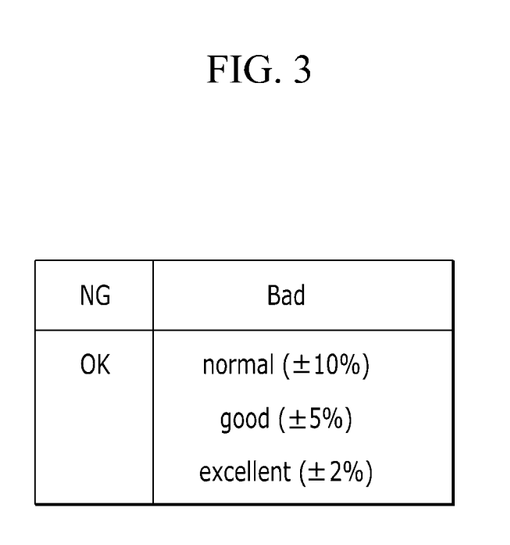
FIG. 3 is a schematic diagram illustrating short-term performance in an engagement guarantee system according to an embodiment of the present disclosure.

FIG. 3 is a schematic diagram illustrating short-term performance in an engagement guarantee system according to an embodiment of the present disclosure.

Referring to FIG. 3, the short-term engagement result may be expressed as Bad, Normal, Good, and Excellent.

Herein, Excellent indicates a case where the engagement torque is included in a first predetermined range (e.g., within an error range of 2%), Good indicates a case where the engagement torque is included in a second predetermined range (e.g., within an error range of 5%), Normal indicates a case where the engagement torque is included in a third predetermined range (e.g., within an error range of 10%), and Bad indicates a case where the engagement torque exceeds a fourth predetermined range (e.g., exceeding an error range of 10%).

In the present embodiment, NG may indicate an engagement-defect signal, and OK may indicate an engagement-normal signal. In addition, an achievement level of a worker may be determined depending on a short-term engagement result. Herein, the achievement level may include or be expressed as one of a first grade (Excellent), a second grade (Good), a third grade (Normal), and a fourth grade (Bad).

In FIG. 3, OK indicates completed engagement and NG indicates a defective engagement state, which needs re-engagement.

Figure 4:
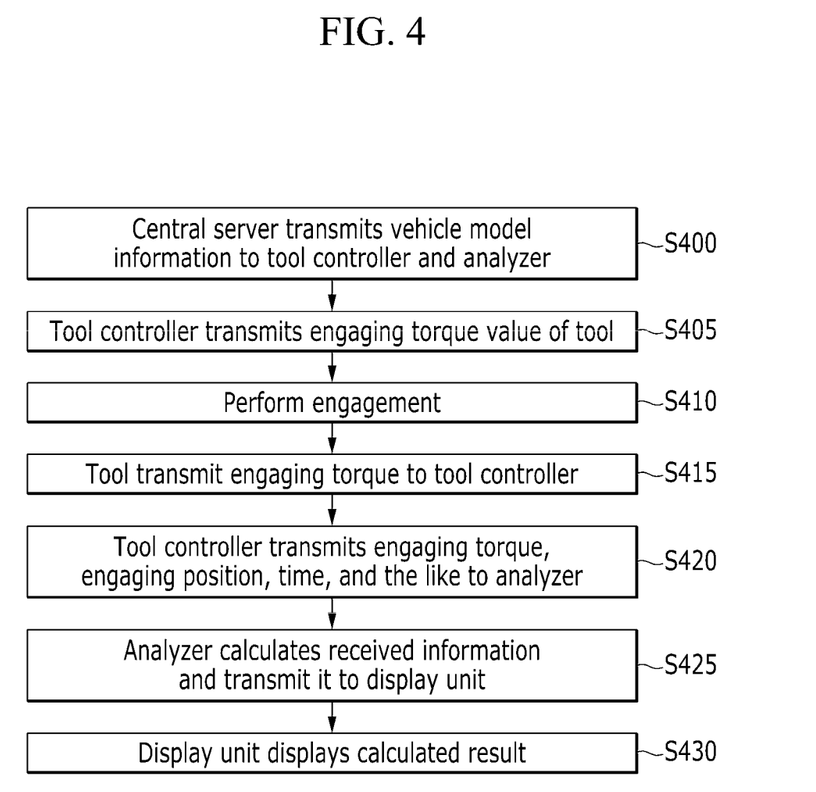
FIG. 4 is a flowchart illustrating a general data flow of an engagement guarantee system according to an embodiment of the present disclosure.

FIG. 4 is a flowchart illustrating a general data flow of an engagement guarantee system according to an embodiment of the present disclosure.

Referring to FIG. 4, in step S400, the sensor 130 senses information of the vehicle 125 from the vehicle tag 120 and transmits the sensed information to the server 135. The server 135 transmits the received vehicle information to the controller 140 and the analyzer 145.

In step S405, the controller 140 wirelessly transmits to the tool 117 an engagement torque value corresponding to an engagement order. In step S410, the worker 100 fastens a predetermined component to the vehicle 125 by using the tool 117 according to the engagement order. Herein, the engagement order may be displayed on the display unit 150, and may be predetermined to correspond to the vehicle.

In step S415, the tool 117 transmits an engagement torque to the controller 140 by using a transceiver. In step S420, the controller 140 transmits information related to the engagement torque, an engagement position, an engagement time, and the like to the analyzer 145, and the analyzer 145 analyzes the received information.

In a step S425, the analyzer 145 transmits the analyzed result to the display unit 150. In step S430, the display unit 150 displays the analyzed result on a screen, and the worker 100 refers to the displayed result.

Figure 5:
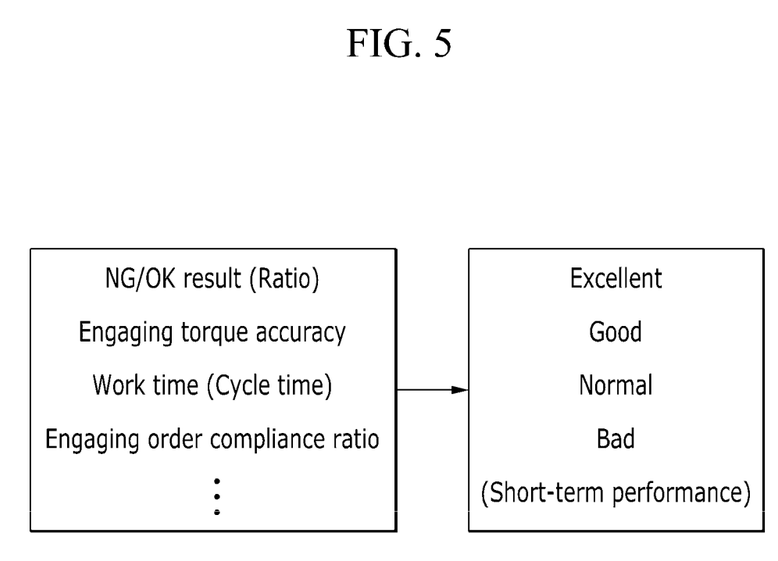
FIG. 5 is a schematic diagram illustrating a factor for analyzing short-term performance in an engagement guarantee system according to an embodiment of the present disclosure.

FIG. 5 is a schematic diagram illustrating a factor for analyzing short-term performance in an engagement guarantee system according to an embodiment of the present disclosure.

Referring to FIG. 5, the analyzer 145 evaluates the short-term result as one of Excellent, Good, Normal, and Bad by using a ratio of NG/OK, an engagement torque accuracy, a working time (cycle time), and a compliance ratio for the engagement order.

In the present embodiment, a standard engagement order may be displayed on the display unit 150. An actual engagement order may be sensed through the engagement position of the tool 117. NG/OK may be determined through an error range of the engagement torque value. The engagement torque accuracy may be determined through a difference value between an actual engagement torque value and a standard engagement torque value.

Figure 6:
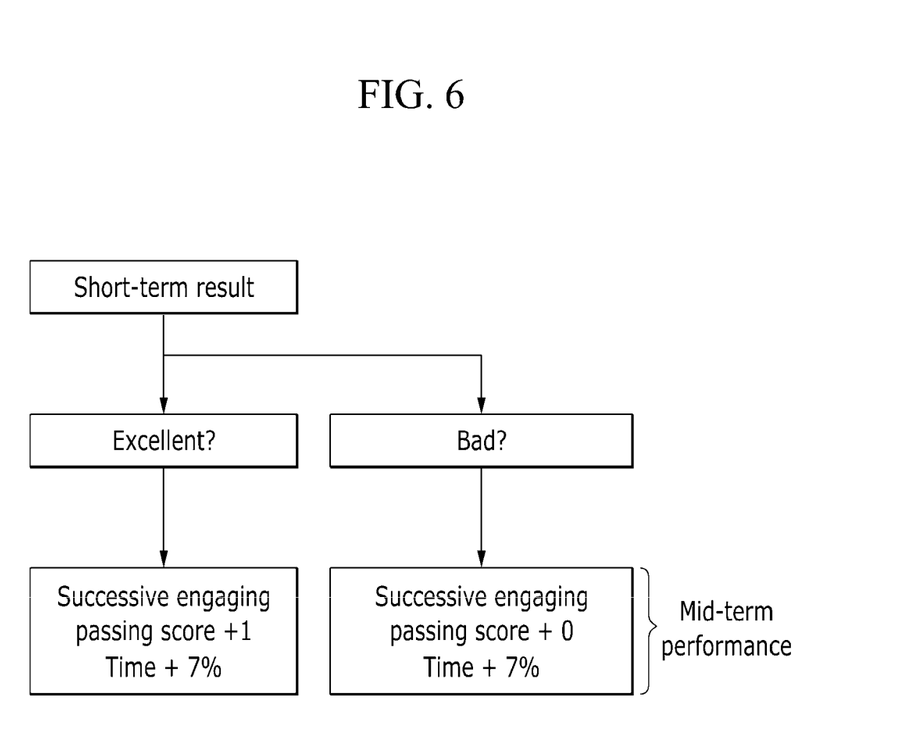
FIG. 6 is a flowchart illustrating mid-term performance in an engagement guarantee system according to an embodiment of the present disclosure.

FIG. 6 is a flowchart illustrating mid-term performance in an engagement guarantee system according to an embodiment of the present disclosure.

Referring to FIG. 6, when the analyzed short-term result is Excellent, the successive engagement passing score is increased by one point and the work time is increased. When the analyzed short-term result is Bad, the successive engagement passing score is not increased and the work time is increased.

In the present embodiment, the successive engagement passing score may indicate mid-term performance. Herein, the successive engagement passing score may be expressed as a combined or combo score.

As a result, when the engagement torque of the tool 117 is continuously included in a predetermined range based on a reference value, the analyzer 145 may generate a combo signal. The mid-term performance may include the combo score of accumulated combo signals.

Figure 7:
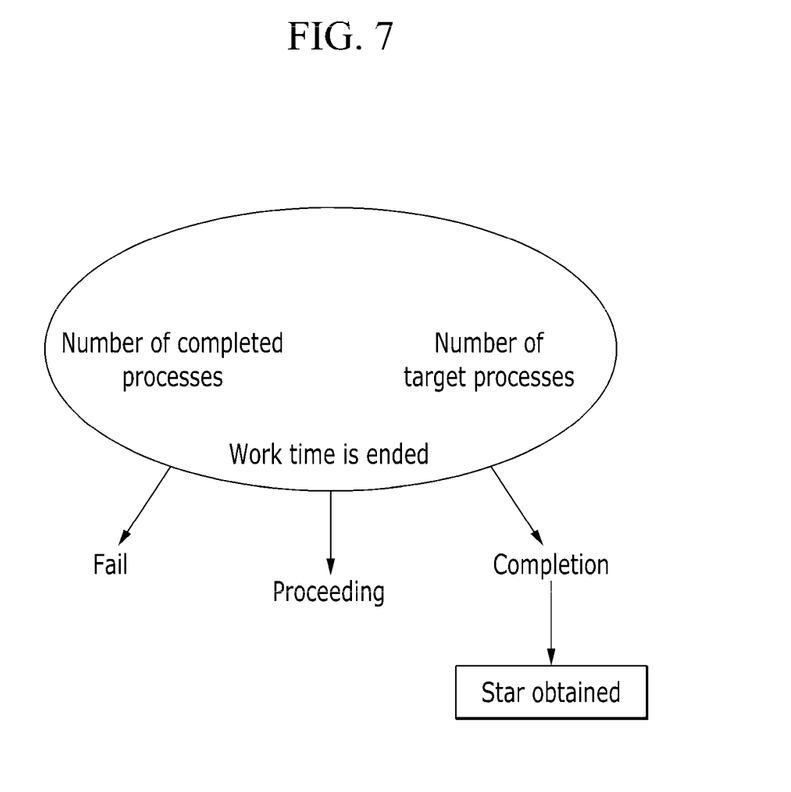
FIG. 7 is a schematic diagram illustrating a game-ending algorithm in an engagement guarantee system according to an embodiment of the present disclosure.

FIG. 7 is a schematic diagram illustrating a game-ending algorithm in an engagement guarantee system according to an embodiment of the present disclosure.

Referring to FIG. 7, the analyzer 145 determines whether an engagement operation of the worker 100 has failed, is to be performed, or has ended, based on the number of completed processes, the number of standard processes, and the work time.

In addition, when it is determined that the engagement operation is completed, one star (score) may be earned as an incentive. Herein, the earned star may indicate a mid-term result, and the number of stars may indicate a long-term result.

Figure 8:
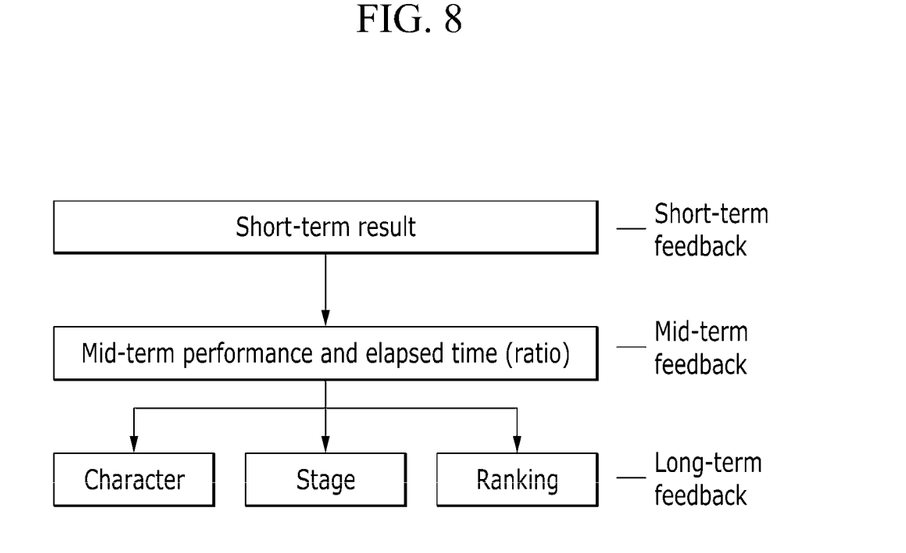
FIG. 8 is a flowchart illustrating a method for analyzing long-term performance in an engagement guarantee system according to an embodiment of the present disclosure.

FIG. 8 is a flowchart illustrating a method for analyzing long-term performance in an engagement guarantee system according to an embodiment of the present invention.

Referring to FIG. 8, short-term feedback may include the short-term result which may be evaluated as one of Excellent, Good, Normal, and Bad. Mid-term feedback may be expressed by using the mid-term result, including the successive engagement score and the elapsed time. Long-term feedback may be expressed by using a character showing a characteristic of the worker, a stage of a target process, a ranking of the worker, and the like.

While this disclosure describes what are presently considered to be practical embodiments, it is to be understood that the disclosure is not limited to the disclosed embodiments. On the contrary, the disclosure is intended to cover various modifications and equivalent arrangements included within the spirit and scope of the appended claims.

What is claimed is:

1. An engagement guarantee system using a gamification method, the system comprising:
    a processor;
    a server;
    a sensor configured to sense vehicle data from a vehicle tag attached to a vehicle, to sense tool data from a tool tag attached to a tool, and to transmit the sensed data to the server;
    a controller configured to receive the vehicle data and the tool data from the server, to transmit an engagement torque value corresponding to the vehicle to the tool, and to receive an engagement result from the tool comprising at least an engagement torque that was used to fasten a predetermined component to the vehicle;
    an analyzer configured to receive the engagement result from the controller, to analyze the engagement result, to generate a combo signal consisting of an engagement passing score when the engagement torque of the tool is continuously included in a predetermined range based on a reference value for the tool, and to transmit an analyzed result including the combo signal to a display unit;
    the display unit configured to display the analyzed result transmitted from the analyzer; and
    a program comprising instructions, execution of which by the processor causes the engagement system guarantee to implement the server, the controller, the analyzer, and the display unit.

2. The engagement guarantee system of claim 1, wherein the analyzer determines whether the engagement torque of the tool is included in a predetermined range, to generate an engagement-defect signal or an engagement-normal signal depending on a determined result, and to transmit the result to the display unit.

3. The engagement guarantee system of claim 1, wherein the engagement result includes an engagement-defect signal, a engagement-normal signal, an actual engagement torque, an engagement order, and a work time.

4. The engagement guarantee system of claim 3, wherein the analyzer determines an achievement level of an engagement process by using the engagement-defect signal, the engagement-normal signal, the actual engagement torque, the engagement order, and the work time.

5. The engagement guarantee system of claim 4, wherein the achievement level includes a predetermined grade.

6. The engagement guarantee system of claim 5, wherein the predetermined grade includes a first grade (Excellent), a second grade (Good), a third grade (Normal), and a fourth grade (Bad).

7. The engagement guarantee system of claim 4, wherein an engagement torque corresponding to the vehicle is predetermined depending on an engagement process and an engagement order.

8. The engagement guarantee system of claim 1, wherein the analyzer analyzes performance of the work depending on an engagement result, and wherein the performance includes short-term performance, mid-term performance, or long-term performance.

9. The engagement guarantee system of claim 8, wherein the short-term performance includes a first grade (Excellent), a second grade (Good), a third grade (Normal), and a fourth grade (Bad).

10. The engagement guarantee system of claim 8,
    wherein the mid-term performance includes a combo score of accumulated combo signals.

11. The engagement guarantee system of claim 8, wherein the long-term performance includes a character showing a worker, a stage showing a route displayed on a screen of the display unit to correspond to an entire engagement process, and a ranking of the worker with respect to all workers.

12. An engagement guarantee system using a gamification method, the system comprising:
- a processor;
- a server;
- a sensor configured to sense vehicle data from a vehicle tag attached to a vehicle, to sense tool data from a tool tag attached to a tool, and to transmit the sensed data to the server;
- a controller configured to receive the vehicle data and the tool data from the server, to transmit an engagement torque value corresponding to the vehicle to the tool, and to receive an engagement result from the tool comprising at least an engagement torque that was used to fasten a predetermined component to the vehicle;
- an analyzer configured to receive the engagement result from the controller, to analyze the engagement result, to generate a combo score of accumulated combo signals consisting of an engagement passing score when the engagement torque of the tool is continuously included in a predetermined range based on a reference value for the tool, and to transmit an analyzed result including the combo score to a display unit;
- the display unit configured to display the analyzed result transmitted from the analyzer; and
- a program comprising instructions, execution of which by the processor causes the engagement system guarantee to implement the server, the controller, the analyzer, and the display unit, wherein the display unit includes:
- an elapsed time display area, which displays a predetermined entire work elapsed time;
- a combo score display area, which displays the combo score; and
- a result display area, which displays a result depending on the engagement result.

13. The engagement guarantee system of claim 1, wherein the analyzer analyzes a score to be given to a worker who uses the tool using the engagement result.

14. The engagement guarantee system of claim 13, wherein the display unit displays a screen corresponding to the score.

* * * * *